United States Patent
Nemiroff et al.

(10) Patent No.: US 7,072,402 B2
(45) Date of Patent: Jul. 4, 2006

(54) METHODS AND APPARATUS FOR DYNAMICALLY ADJUSTING F-CODES FOR A DIGITAL PICTURE HEADER

(75) Inventors: Robert S. Nemiroff, Carlsbad, CA (US); Siu-Wai Wu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 627 days.

(21) Appl. No.: 10/145,166

(22) Filed: May 13, 2002

(65) Prior Publication Data

US 2003/0210745 A1 Nov. 13, 2003

(51) Int. Cl.
*H04N 7/12* (2006.01)
(52) U.S. Cl. .............................. 375/240.26; 375/240.16
(58) Field of Classification Search ........... 375/240.16, 375/240.17, 240.26; 382/106–107, 236, 382/238; 386/109, 111
See application file for complete search history.

(56) References Cited

U.S. PATENT DOCUMENTS 6,724,821 B1 * 4/2004 Sawada ................. 375/240.16

2003/0133512 A1 * 7/2003 Moni et al. ................. 375/246
2003/0190059 A1 * 10/2003 Piccinelli et al. ........... 382/107
2003/0202604 A1 * 10/2003 Brightwell et al. .... 375/240.25

OTHER PUBLICATIONS

"Generic Coding of Moving Pictures and Associated Audio: Recommendation H.262", ISO/IEC JTC1/SC29/WG11 NO702, Mar. 25, 1994, pp. 83-85 (4 pages).
"Coding Representation of Picture and Audio Information: Test Model 5", ISO/IEC JTC1/SC29/WG11 MPEG93/457, Apr. 1993, pp. 39-41 and 70 (5 pages).

* cited by examiner

*Primary Examiner*—Vu Le
(74) *Attorney, Agent, or Firm*—Lawrence T. Cullen

(57) ABSTRACT

The present invention provides methods and apparatus for dynamically adjusting f-codes for a digital picture header of a coded picture. A video encoder having at least one motion estimation stages is provided for encoding the current picture. Motion vectors are determined for one motion estimation stage of the encoder. The motion vectors are analyzed to determine a maximum motion vector range for the picture. A corresponding minimum f-code is determined for the maximum range. The minimum f-code is then inserted into the digital picture header. In this manner, the f-codes carried in the digital picture header can be reduced to the minimum required value, thus reducing the number of bits needed to encode the f-codes.

8 Claims, 5 Drawing Sheets

METHODS AND APPARATUS FOR DYNAMICALLY ADJUSTING F-CODES FOR A DIGITAL PICTURE HEADER

BACKGROUND OF THE INVENTION

The present invention relates to the field of digital video compression. More specifically, the present invention relates to methods and apparatus for dynamically adjusting f-codes for a digital picture header, depending on the motion vector range required for each picture.

Digital television offers viewers high quality video entertainment with features such as pay-per-view, electronic program guides, video-on-demand, weather and stock information, as well as Internet access. Video images, packaged in an information stream, are transmitted to the user via a broadband communication network over a satellite, cable, or terrestrial transmission medium. Due to bandwidth and power limitations, efficient transmission of film and video demands that compression and formatting techniques be extensively used. Protocols developed by the Motion Pictures Experts Group (MPEG), such as MPEG-2, attempt to maximize bandwidth utilization for film and video information transmission by adding a temporal component to a spatial compression algorithm.

The video portion of the television signal comprises a sequence of video "frames" that together provide a moving picture. In digital television systems, each line of a video frame is defined by a sequence of digital data bits, or pixels. Each video frame is made up of two fields, each of which contains one half of the lines of the frame. For example, a first or odd field will contain all the odd numbered lines of a video frame, while a second or even field will contain the even numbered lines of that video frame. A large amount of data is required to define each video frame of a television signal. For example, 7.4 megabits of data is required to provide one video frame of a National Television Standards Committee (NTSC) television signal. This assumes a 640 pixel by 480 line display is used with 8 bits of intensity value for each of the primary colors red, green, and blue. High definition television requires substantially more data to provide each video frame. In order to manage this amount of data, the data must be compressed.

Digital video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spatial correlation, but can also utilize similarities among adjacent frames to further compact the data. In such systems, motion compensation (also known as differential encoding) is used to transmit only the difference between an actual frame and a prediction of an actual frame. The prediction is derived from a previous (or future) frame of the same video sequence. In such motion compensation systems, motion vectors are derived, for example, by comparing a block of pixel data from a current frame to similar blocks of data in a previous frame. A motion estimator determines how a block of data from the previous frame should be adjusted in order to be used in the current frame.

Video compression standards, such as MPEG-2, provide for compression of video data by sending only the changes between different video frames. A first type of frame, known as a predictive coded frame or "P" frame (also referred to herein as a P-picture), contains an abridged set of data used by the decoder to predict a full frame from a previous "P" frame or from a previous complete frame (an intra-coded "I" frame or I-picture) in the video stream. The stream merely carries "fine tuning" information to correct errors from an approximate prediction. An I-frame is compressed without motion prediction. Thus, a full video frame can be reconstructed from an I-frame without reference to any other frame. In this manner, errors due to DCT/IDCT mismatches will be eliminated once an I-frame arrives and is decoded. Bi-directional predictive coded frames (a "B" frame or B-picture) are similar to P-frames, except that the prediction is made not only from the previous I or P-frame, but also from a future frame (typically the next frame). MPEG data streams encoded in this manner are referred to herein as "I-frame based MPEG data streams." An I-frame based MPEG data stream may start with an optional Group-of-Pictures (GOP) header followed by an I-frame. The video frame can be reconstructed from the GOP without reference to other frame information.

In the MPEG-2 format, video information is digitized and compressed before being encoded. The compression can be considered part of the encoding. As shown in FIG. 1, compressed video from a program 100 is divided into variable-length units called Packetized Elementary Stream (PES) packets, such as PES packets 105 and 110, each of which contains a variable number of encoded pictures. For example, the PES packet 105 includes encoded pictures 119, 121, . . . , 124.

The example PES packet 105 has a header 116 and a payload portion 117. Moreover, each picture in the PES packet 105 is prefixed by a picture header containing information about the picture. For example, the picture 119 has a picture header 118, the picture 121 has a picture header 120, and the picture 124 has a picture header 123.

For transmission and storage purposes, PES packets are further broken down into fixed-length units called transport packets. Each transport packet is formed by subdividing the contents of successive portions of a PES packet. With the MPEG-2 standard, each transport packets comprises 188 bytes. Generally, the PES packet length is much larger than the size of a transport packet. Each transport packet has a transport packet header and a payload portion.

An f-code is a code carried in the digital picture header (e.g., picture header 118, 120, and 123 of FIG. 1) of a compressed video stream (such as an MPEG-2 encoded video stream). The f-code defines the search range within a frame or field for the motion vectors used to decode the picture (e.g., a frame or field of video). A P-picture requires only forward horizontal and forward vertical motion vectors, such that only corresponding "forward" f-codes need to be determined, while a B-picture requires forward horizontal, forward vertical, backward horizontal, and backward vertical motion vectors and corresponding f-codes. As an example, FIG. 1 shows picture header 118 containing a forward f-code 130 and a backward f-code 132.

The value of the f-codes for a picture are normally determined prior to the start of encoding that picture. Demands for lower bit-rates and higher video quality require efficient use of available bandwidth. Sending an f-code larger than needed for the current picture wastes bits that could be used to provide better video quality.

As described in ISO/IEC JTC1/SC29/WG11/N0400 (MPEG-2) "Test Model 5" (TM5), April 1993, which is incorporated herein and made a part hereof by reference, encoding each motion vector having a non-zero motion code requires a motion residual which uses f-code −1 bits. Hence, reducing one f-code by one results in savings of as much as much as 1 bit per motion vector. A full resolution NTSC picture has 1350 macroblocks. Each macroblock may have from zero to four motion vectors. Therefore, reducing f-codes to a value that is only as large as needed for the current picture can result in substantial bit savings in encoding that picture. For example, the maximum savings achieved by reducing all f-codes used to encode a B-picture by one is 5,400 bits.

It would be advantageous to provide methods and apparatus for adjusting (i.e. minimizing) f-codes in a digital picture header, depending on the maximum motion vector range required for each picture. It would be further advantageous to reduce f-codes in a digital picture header so that such f-codes were only as large as necessary to allow decoding of the picture, thereby resulting in bit savings when encoding the picture.

The methods and apparatus of the present invention provide the foregoing and other advantages.

SUMMARY OF THE INVENTION

The present invention provides methods and apparatus for dynamically adjusting f-codes for a digital picture header of a coded picture. A video encoder having at least one motion estimation stage is provided for encoding a current picture of a video input. Motion vectors are determined for one motion estimation stage of the encoder. The motion vectors are analyzed to determine a maximum motion vector range for the picture. A corresponding minimum f-code is determined for the maximum range. The minimum f-code is then inserted into the digital picture header. In this manner, the f-codes carried in the digital picture header can be reduced to the minimum required value, thus reducing the number of bits needed to encode the f-codes.

BRIEF DESCRIPTION OF THE DRAWINGS

The present invention will hereinafter be described in conjunction with the appended drawing figures, wherein like numerals denote like elements, and.

DETAILED DESCRIPTION OF THE INVENTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred embodiment of the invention. It should be understood that various changes may be made in the function and arrangement of elements without departing from the spirit and scope of the invention as set forth in the appended claims.

Figure 1:
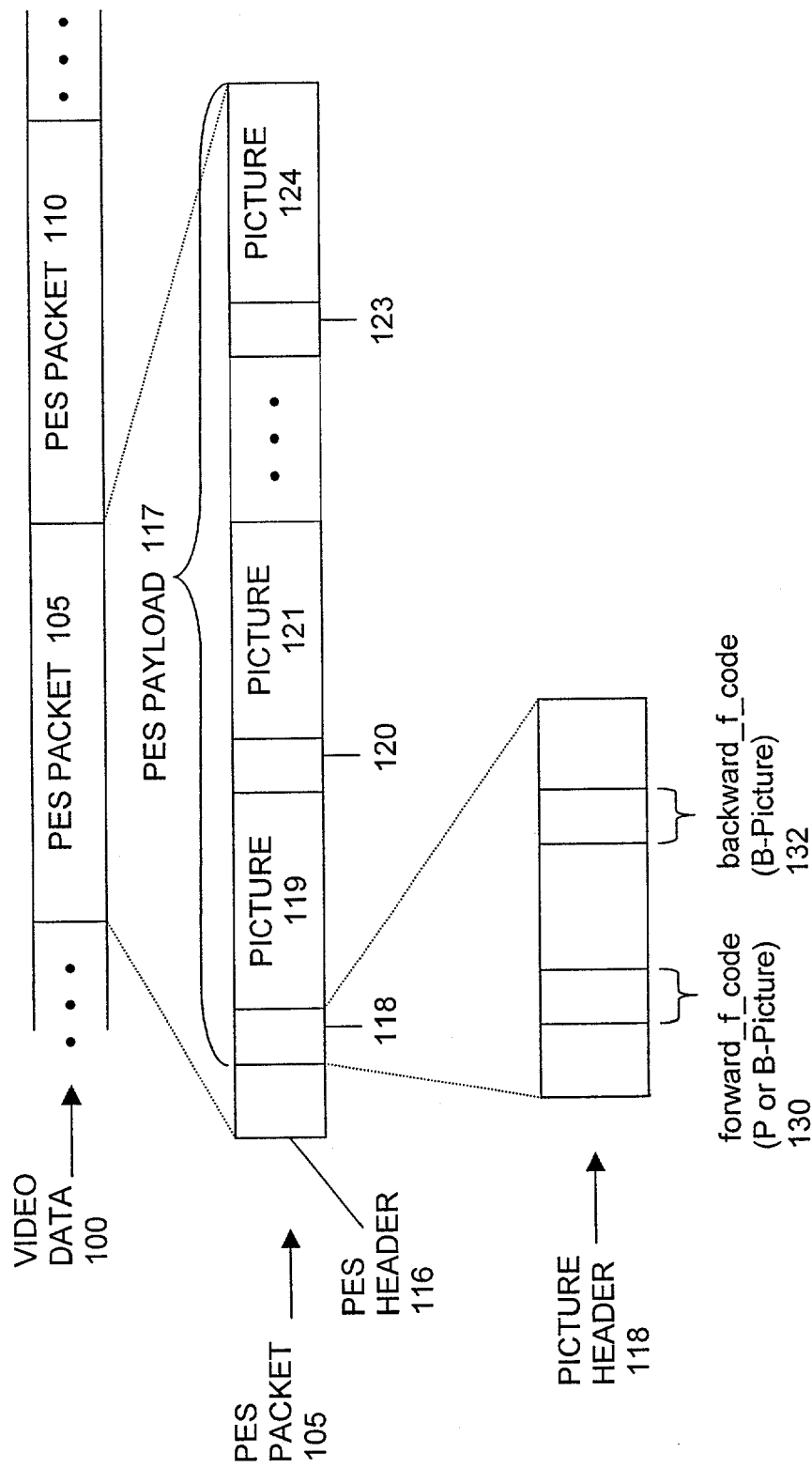
FIG. 1 shows the make up an example MPEG-2 transport stream.
Figure 2:
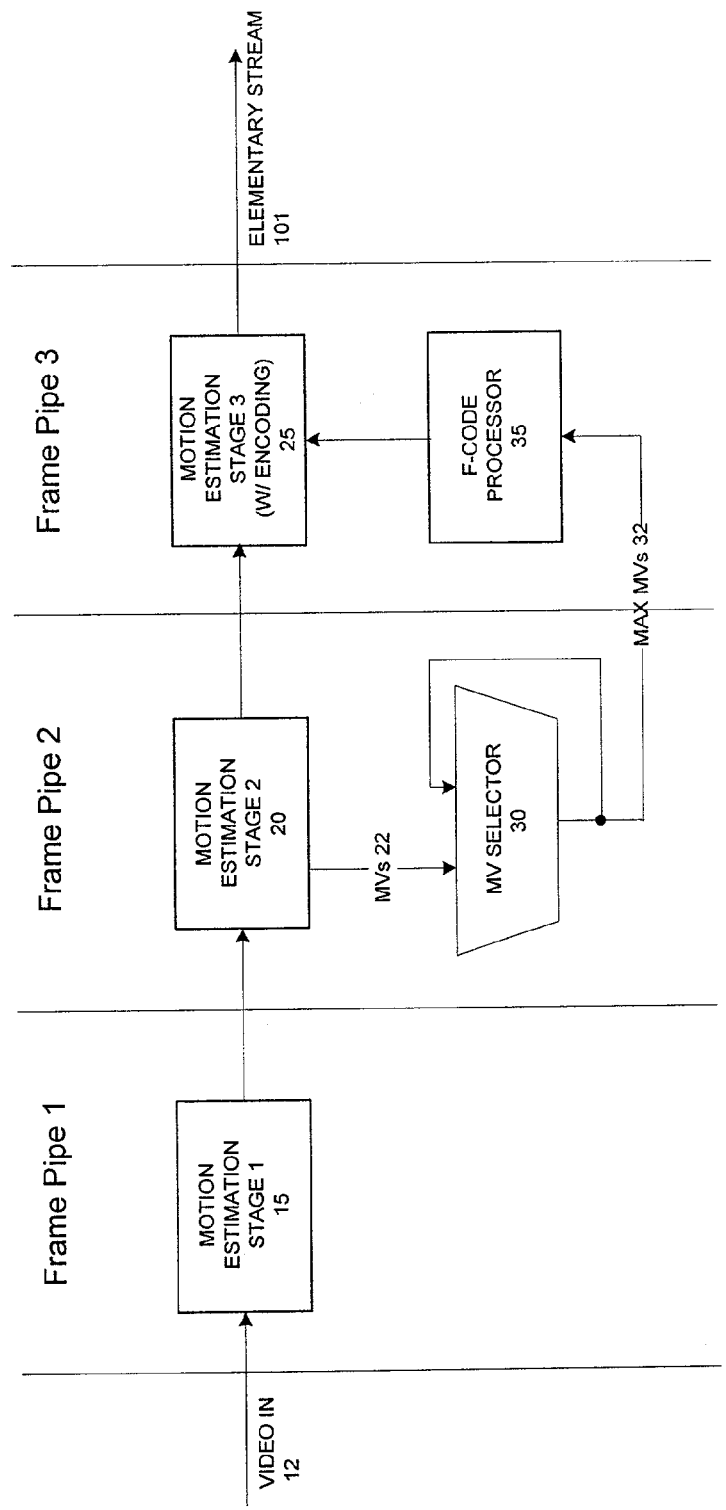
FIG. 2 shows a first example embodiment of the invention.

In an example embodiment of the invention as shown in FIG. 2, methods and apparatus are provided for dynamically adjusting f-codes for a digital picture header of a coded picture. A video encoder 10 having at least one motion estimation stage (e.g., motion estimation stages 15, 20, and 25) is provided for determining motion vectors for use in encoding a current picture of video input 12. Motion vectors are determined for one motion estimation stage (e.g., the second motion estimation stage (20) of a three stage encoder) of the encoder 10. The motion vectors 22 are analyzed at a selector 30 to determine a maximum motion vector range for the picture (e.g., defined by the maximum motion vectors 32). A corresponding minimum f-code is determined (e.g., at f-code processor 35) for the maximum range. The minimum f-code is then inserted into the digital picture header (e.g., at the third motion estimation stage 25). In this manner, the f-codes carried in the digital picture header can be reduced to the minimum required value, thus reducing the number of bits needed to encode the f-codes. The encoder 10 produces a compressed elementary stream 101.

In one example embodiment of the invention as shown in FIG. 2, the motion vectors may be determined for use during a second to last motion estimation stage 20. In this case, the minimum f-code will be determined by the f-code processor 35 prior to encoding of the picture, enabling the minimum f-code to be inserted into the digital picture header prior to encoding at the third motion estimation stage 25, which also provides for encoding of the picture (e.g., variable length encoding, texture coding, and the like). The f-code processor may determine the minimum f-code based on the maximum motion vector range for the picture as determined by the selector 30. A look-up table may be used by the f-code processor to correlate the maximum motion vector range and the minimum f-code. The maximum motion vector range is determined by adding the value of the maximum motion vector from the second to last stage with the maximum search range of the final stage.

Figure 3:
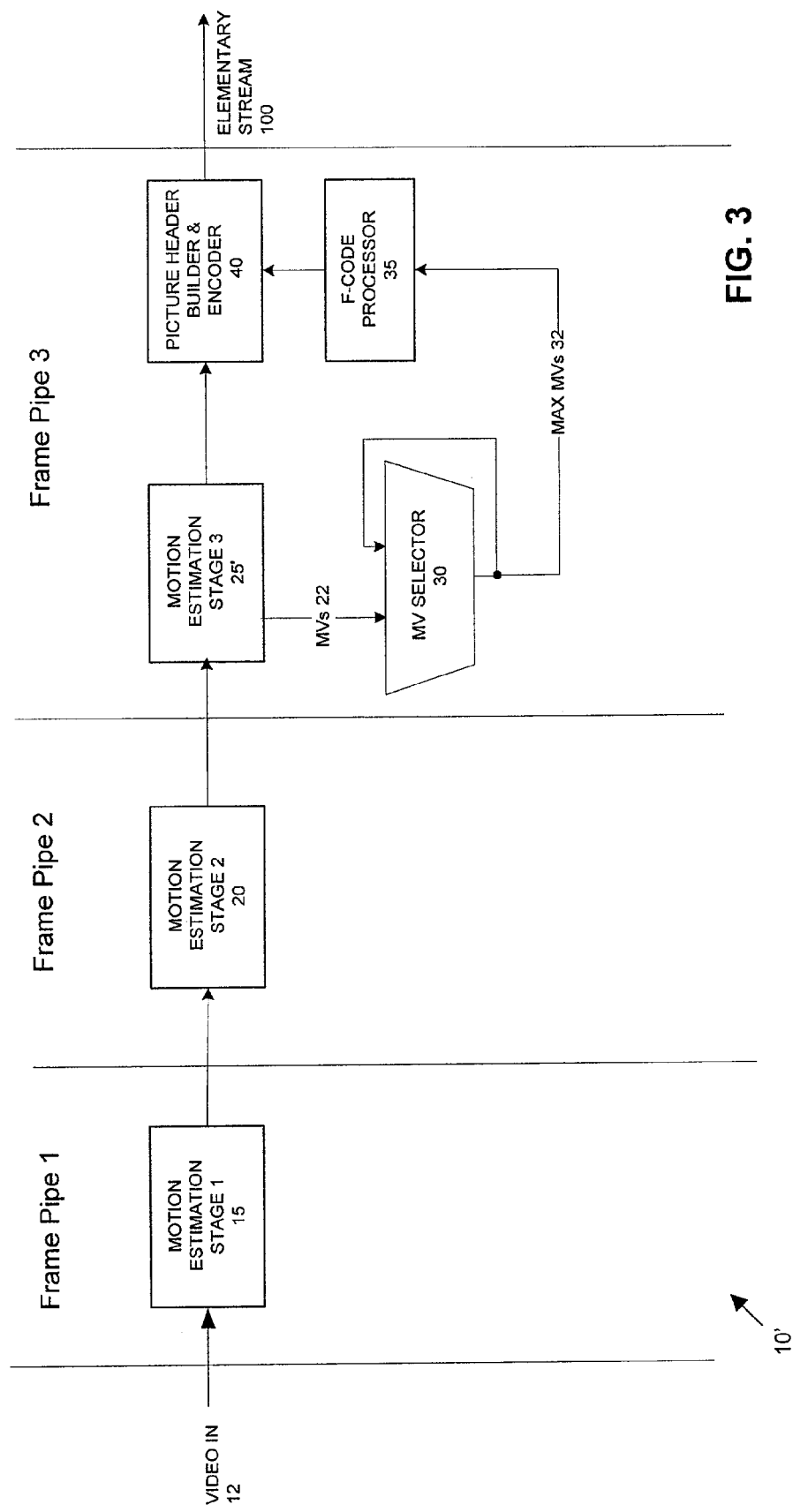
FIG. 3 shows a second example embodiment of the invention.

Alternatively, as shown in FIG. 3, the motion vectors 22 may be determined for use during a final motion estimation stage 25' of an encoder 10'. In this case, the picture header containing the minimum f-code is constructed at picture header builder/encoder 40 subsequent to the final motion estimation stage 25' and prior to encoding the picture. Since the minimum f-code will not be determined by the f-code processor 35 until after the final motion estimation stage 25', encoding of the picture must take place after processing thereof at the final motion estimation stage 25' is complete, rather than during the picture processing at the final motion estimation stage 25 as in FIG. 2.

The invention is also applicable to encoders having only a single motion estimation stage. For example, FIG. 3 shows the invention as implemented in association with the final motion estimation stage 25' of an encoder 10' having three motion estimation stages 15, 20 and 25'. However, It should be appreciated by those skilled in the art that the final motion estimation stage 25' of the encoder 10' of FIG. 3 may comprise the only motion estimation stage of an encoder in an example embodiment of the invention. In other words, in an example embodiment of the invention as described in connection with FIG. 3, the motion vectors used to determine the f-codes may be determined during a final motion estimation stage of an encoder or in the only motion estimation stage of an encoder.

Those skilled in the art will appreciate that a P-picture may use both horizontal and vertical motion vectors and corresponding f-codes. Therefore, the maximum motion vector range may comprise at least one of a maximum horizontal range or a maximum vertical range. A corresponding minimum vertical f-code and a minimum horizontal f-code can then be determined by the f-code processor 35 for each of the maximum ranges. The maximum horizontal and maximum vertical ranges may be ranges of either a field or a frame of the picture. Those skilled in the art will appreciate that the same f-code will result in different motion vector ranges for a field or a frame.

Figure 4:
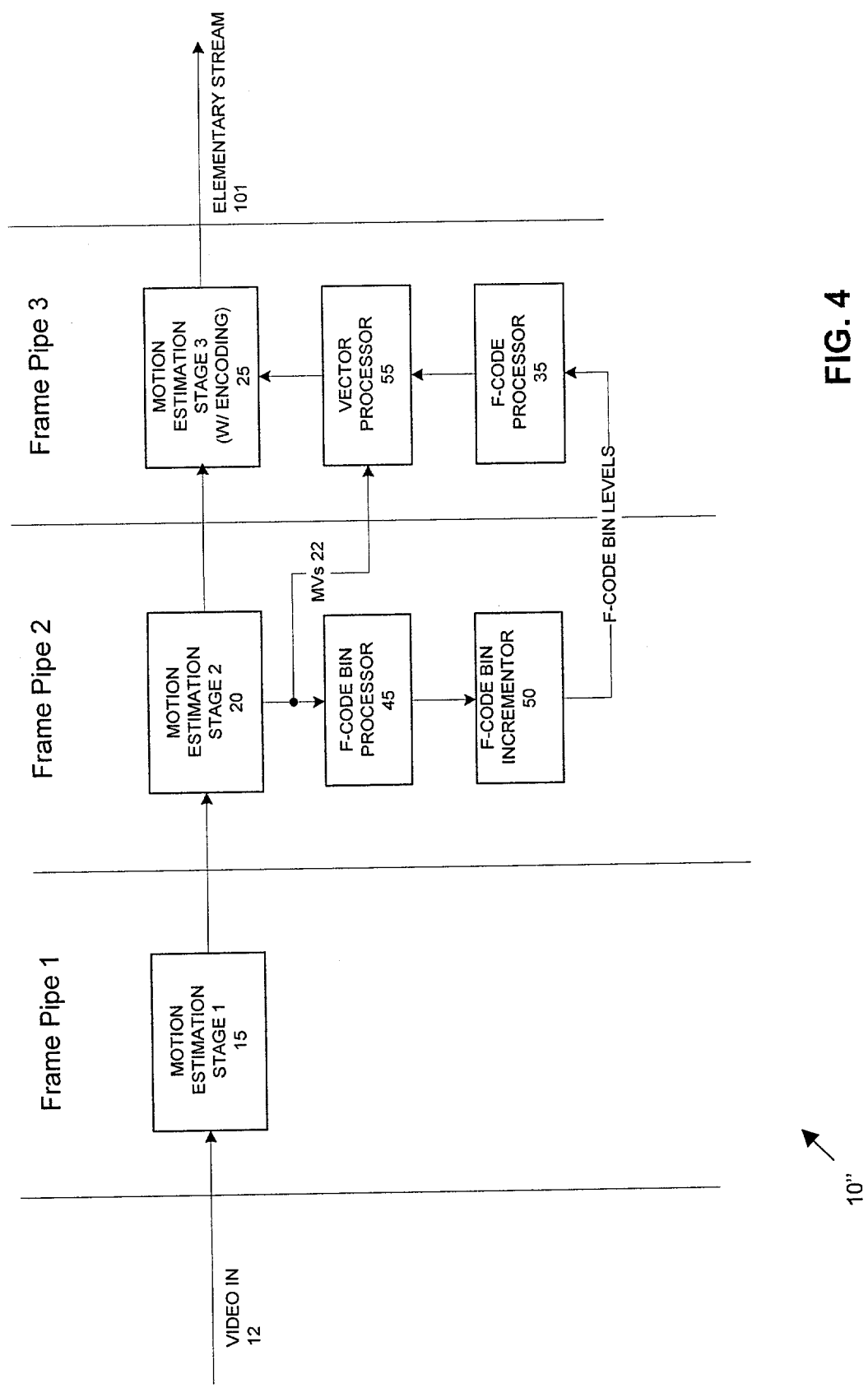
FIG. 4 shows a third example embodiment of the invention.

A further illustrative example embodiment of the invention is shown in FIG. 4. In the encoder 10" of FIG. 4, the determination of the corresponding minimum horizontal or the minimum vertical f-code is accomplished by constructing a histogram representing a plurality of f-code bins for horizontal and vertical motion vectors for the picture, each f-code bin representing the occurrence of horizontal or vertical motion vectors within a respective f-code range for that bin. Then, the minimum horizontal f-code can be determined based on the bin having a maximum respective f-code range for the horizontal motion vectors. Similarly, the minimum vertical f-code can be determined based on the bin having a maximum respective f-code range for the vertical motion vectors.

As shown in FIG. 4, an f-code bin processor 45 is provided for constructing the f-code bins, analyzing the motion vectors (MVs 22) and placing each of the MVs 22 in an appropriate f-code bin based on the range of that particular motion vector. The f-code processor 35 then determines the minimum horizontal and minimum vertical f-codes based on the bins having a maximum respective f-code range for the horizontal and vertical motion vectors.

In order to provide further bit savings by reducing f-codes in the digital picture header, the motion vectors in the largest f-code bins may be analyzed to determine whether their corresponding f-codes can be reduced. An f-code bin incrementor 50 may be provided to determine the number of motion vectors in each f-code bin, for example, by incrementing a counter for each bin each time a motion vector is placed in that bin by the f-code bin processor 45. The number of the motion vectors present in a largest f-code bin having a largest f-code range are determined. In the event a predetermined number of vectors are present in the largest f-code bin, the vector processor 55 and the f-code processor 35 in cooperation can make a determination, based on bit savings, whether to: (1) reduce f-codes corresponding to the motion vectors in the largest bin and force the motion vectors in the largest bin to new values within a maximum f-code range for the picture prior to encoding; (2) allow encoding with the motion vectors in the largest bin and the corresponding f-codes; or (3) reduce f-codes corresponding to the motion vectors in the largest bin and intra-code macroblocks of the picture corresponding to the motion vectors from the largest bin.

In the event the determination is made to reduce the f-codes corresponding to motion vectors in the largest bin and force the motion vectors in the largest bin to new values within a maximum f-code range for the picture, the vector processor 55 will replace these motion vectors with motion vectors that are within the maximum f-code range for the picture.

The maximum f-code range for the picture may be based on the respective f-code ranges for the bins other than the largest bin. In other words, the largest f-code bin having the largest motion vector range will not necessarily be used to determine the maximum f-code range for the picture, as the motion vectors in the largest bin may be reduced as discussed above.

The predetermined number of vectors present in the largest bin may be less than three. Therefore, whenever it is determined that there are, for example two vectors present in the largest f-code bin, the encoder 10" will determine, based a comparison of the bit savings achieved, whether to reduce the f-codes of these two vectors and force the two vectors to new values within the maximum range for the picture, to allow encoding with the f-codes and vectors as is, or to reduce the f-codes and intra code the macroblocks.

Those skilled in the art will appreciate that the predetermined number of vectors present in the largest bin may be any number (e.g., 1, 2, 3, 4, . . .). Further, those skilled in the art will appreciate that the largest f-code bins for both horizontal and vertical motion vectors may be analyzed in the same manner. In addition, the next largest f-code bin may be analyzed in the same manner.

Further, although the f-code bin selector 45 and f-code bin incrementor 50 are shown in connection with the second motion estimation stage (frame pipe 2) of the encoder 10" of FIG. 4, these functions may also take place in the third or final motion estimation stage. Such an example embodiment would require that variable length encoding occur and the picture header be constructed after the final motion estimation stage, as described above in connection with FIG. 3.

Figure 5:
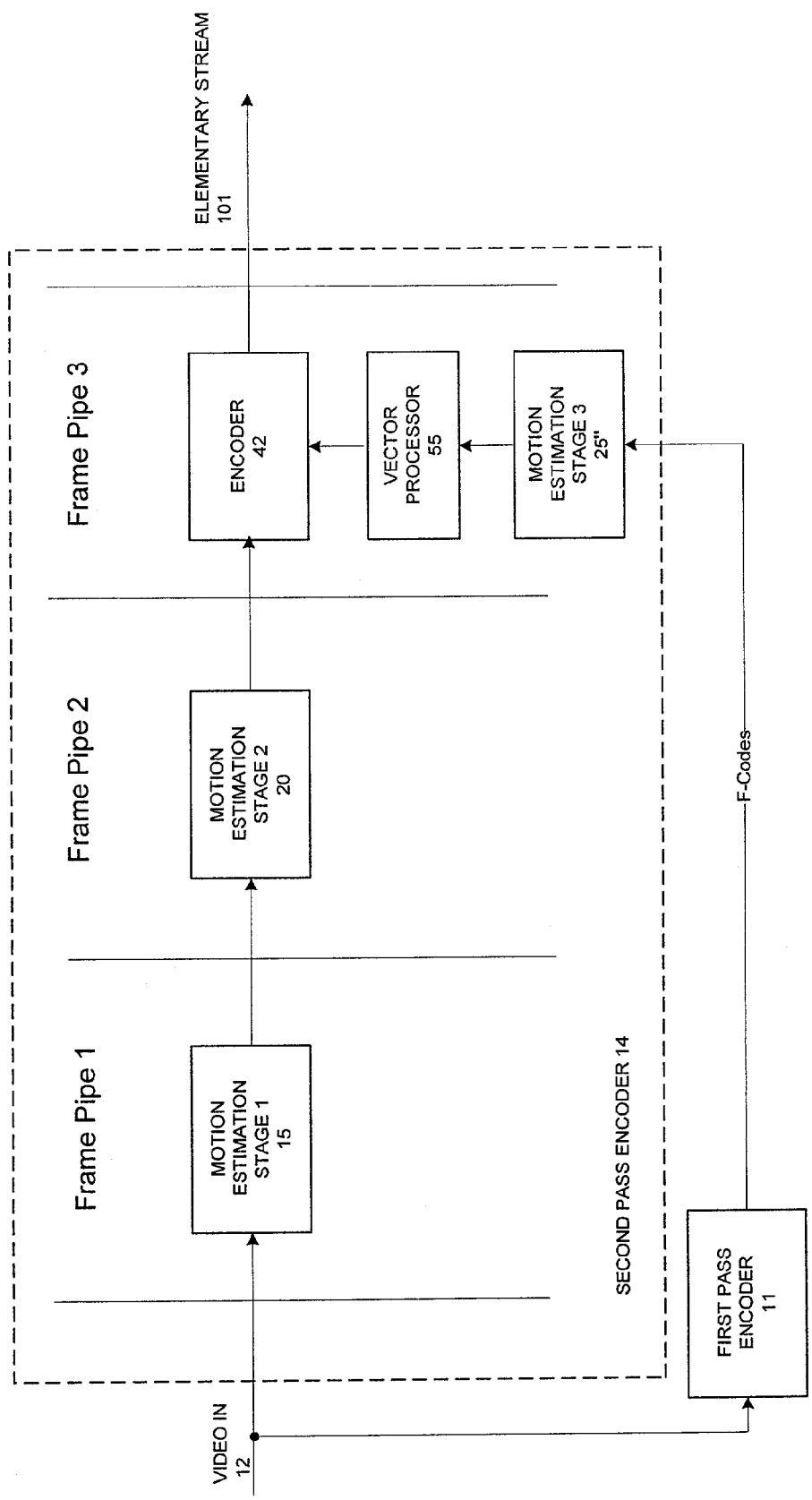
FIG. 5 shows a fourth example embodiment of the invention.

The invention may also be implemented in a two-pass encoder as shown in FIG. 5. In the example embodiment of the invention as shown in FIG. 5, the encoder may comprise a first pass encoder 11 and a second pass encoder 14. Motion vectors from a first pass encoding at first pass encoder 11 are used to determine the f-codes needed for a second pass encoding at the second pass encoder 14. The second pass encoder 14 determines whether any motion vectors exceed the f-code range established by the f-codes from the first pass encoder 11 and reduces the values of any such motion vectors which exceed the f-code range.

In an example two-pass encoding embodiment, the f-codes may be determined at the first pass encoder 11 as discussed above in connection with FIGS. 2–4 (e.g., encoder 10 of FIG. 2, encoder 10' of FIG. 3, and encoder 10" of FIG. 4 may be considered a first pass encoder). The f-codes from the first pass encoder 11 may be provided to the third motion estimation stage 25" of the second pass encoder 14. A vector processor 55 can then determine whether any motion vectors from the third motion estimation stage 25" are outside the f-code range established by the first pass encoder 11, and if so, the vector processor 55 can reduce the value of any such motion vectors. The f-codes can be inserted into the digital picture header during encoding at encoder 42.

Those skilled in the art will appreciate that the various example embodiments discussed above in connection with FIGS. 2–4 may be implemented in the two-pass encoder of FIG. 5.

Those skilled in the art will also appreciate that a B-picture requires forward horizontal, forward vertical, backward horizontal, and backward vertical motion vectors and corresponding f-codes. Therefore, where the picture is a B-picture, separate minimum f-codes may be determined for forward motion vectors and for backward motion vectors, as well as for horizontal and vertical motion vectors as discussed above.

The encoding may comprise high definition television encoding. The picture may be an MPEG-2 picture, or the like.

Although examples of the present invention are described in connection with encoders having three motion estimation stages as shown in the Figures, those skilled in the art will appreciate that the invention may be implemented in an encoder which has at least one or more motion estimation stage. Further, those skilled in the art will appreciate that the motion estimation stages 15, 20 and 25, the f-code processor 35, the selector 30, the picture header builder 40, the bin selector 45, the bin incrementor 50, and the vector processor 55 each illustrate processing steps in an associated processing stage of the encoder (e.g., Frame Pipe 1, Frame Pipe 2, and Frame Pipe 3) and are shown separately for ease of explanation. These functions may be implemented in a variety of ways. For example, one or more of these functions may be combined in a one or more processors in the encoder.

It should now be appreciated that the present invention provides advantageous methods and apparatus for reducing the number of bits needed to encode a picture by adjusting the f-code in the digital picture header so that the f-code is only as large as needed to allow decoding of the picture.

Although the invention has been described in connection with various illustrated embodiments, numerous modifications and adaptations may be made thereto without departing from the spirit and scope of the invention as set forth in the claims.

What is claimed is:

1. A method for dynamically adjusting f-codes for a digital picture header of a coded picture, comprising the steps of:
   determining motion vectors for one motion estimation stage of a video encoder encoding said picture, said video encoder having at least two motion estimation stages;
   analyzing the motion vectors to determine a maximum motion vector range for said picture;
   determining a corresponding minimum f-code for said maximum range, wherein
      said maximum range comprises at least one of a maximum horizontal range or a maximum vertical range; and
      a corresponding minimum vertical f-code and a minimum horizontal f-code is determined for each of said maximum ranges, wherein the step of determining the corresponding minimum horizontal or the minimum vertical f-code further comprises:
         constructing a histogram representing a plurality of f-code bins for horizontal and vertical motion vectors for said picture, each f-code bin representing the occurrence of horizontal or vertical motion vectors within a respective f-code range for that bin;
         determining the minimum horizontal f-code based on the bin having a maximum respective f-code range for said horizontal motion vectors; and
         determining the minimum vertical f-code based on the bin having a maximum respective f-code range for said vertical motion vectors; and
   inserting said minimum f-code into the digital picture header.

2. A method in accordance with claim 1, further comprising:
   determining a number of motion vectors present in a largest f-code bin having a largest f-code range; and
   in the event that a predetermined number of vectors are present in said largest bin,
      determining whether to:
         (1) reduce f-codes corresponding to the motion vectors in the largest bin and force the motion vectors in the largest bin to new values within a maximum f-code range for said picture prior to encoding;
         (2) allow encoding with the motion vectors in the largest bin and the corresponding f-codes; or
         (3) reduce f-codes corresponding to the motion vectors in the largest bin and intra-code macroblocks of said picture corresponding to the motion vectors from the largest bin.

3. A method in accordance with claim 2, wherein the maximum f-code range for said picture is based on the respective f-code ranges for the bins other than said largest bin.

4. A method in accordance with claim 2, wherein said predetermined number of vectors present in said largest bin is less than three.

5. Encoder apparatus for dynamically adjusting f-codes for a digital picture header of a coded picture comprising:
   at least one motion estimation stage for determining motion vectors for use in encoding said picture;
   a motion vector selector capable of analyzing motion vectors from one of the motion estimation stages to determine a maximum motion vector range for said picture;
   an f-code processor capable of determining a corresponding minimum f-code for said maximum range, wherein:
      said maximum range comprises at least one of a maximum horizontal range or a maximum vertical range; and
      said f-code processor determines a corresponding minimum vertical f-code and a minimum horizontal f-code for each of said maximum ranges;
   wherein said minimum f-code is inserted into the digital picture header; and
   a bin processor capable of constructing a histogram representing a plurality of f-code bins for horizontal and vertical motion vectors for said picture, each f-code bin representing the occurrence of horizontal or vertical motion vectors within a respective f-code range for that bin;
   wherein said f-code processor:
      determines the minimum horizontal f-code based on the bin having a maximum respective f-code range for said horizontal motion vectors; and
      determines the minimum vertical f-code based on the bin having a maximum respective f-code range for said vertical motion vectors.

6. Apparatus in accordance with claim 5, further comprising:
   a bin incrementor capable of determining a number of motion vectors present in each f-code bin; and
   a vector processor capable of modifying motion vectors;
   wherein, in the event a predetermined number of vectors are present in a largest f-code bin having a largest f-code range, said vector processor and said f-code processor in cooperation determine whether to:
      (1) reduce f-codes corresponding to the motion vectors in the largest bin and force the motion vectors in the largest bin to new values within a maximum f-code range for said picture prior to encoding;
      (2) allow encoding with the motion vectors in the largest bin and the corresponding f-codes; or
      (3) reduce f-codes corresponding to the motion vectors in the largest bin and intra-code macroblocks of said picture corresponding to the motion vectors from the largest bin.

7. Apparatus in accordance with claim 6, wherein the maximum f-code range for said picture is based on the respective f-code ranges for the bins other than said largest bin.

8. Apparatus in accordance with claim 6, wherein said predetermined number of vectors present in said largest bin is less than three.

* * * * *